E. E. COAR.
ANTIFREEZING SILL COCK.
APPLICATION FILED AUG. 14, 1919.
1,412,042.
Patented Apr. 11, 1922.
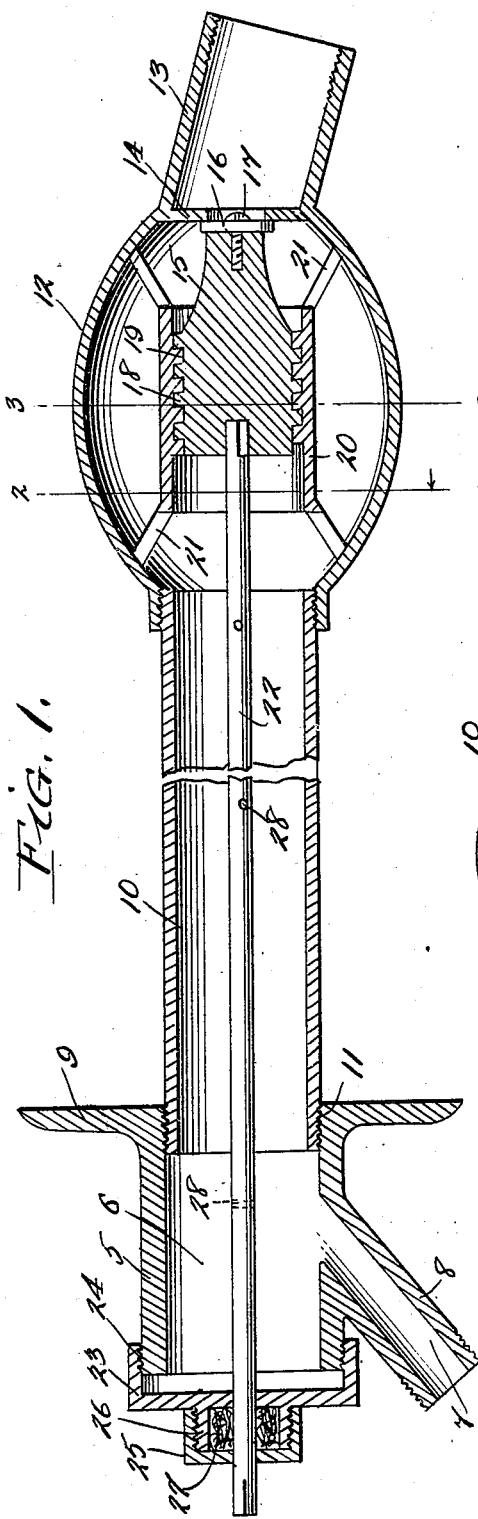
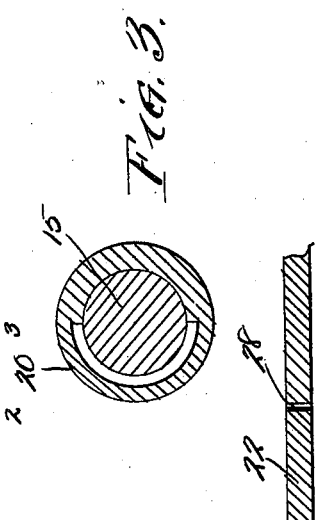
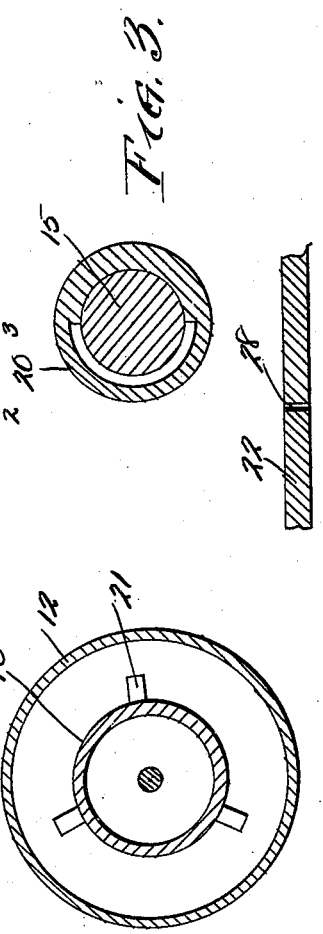
Enos E. Coar
Inventor

UNITED STATES PATENT OFFICE.

ENOS E. COAR, OF SOUTH BEND, INDIANA.

ANTIFREEZING SILL COCK.

1,412,042.　　　　Specification of Letters Patent.　Patented Apr. 11, 1922.

Application filed August 14, 1919. Serial No. 317,477.

*To all whom it may concern:*

Be it known that I, ENOS E. COAR, a citizen of the United States, residing at South Bend, in the county of St. Joseph and State of Indiana, have invented certain new and useful Improvements in an Antifreezing Sill Cock, of which the following is a specification.

My invention relates to cocks and more particularly to sill cocks, the primary object of which is to provide a device of this character in which the valve mechanism is positioned at such a remote distance from the faucet, so as to prevent water in the same from freezing.

A further object of the invention is to provide a device of the above mentioned character, that is composed of a few parts, simple in structure, easy to operate, reliable in such operation, and inexpensive to manufacture.

A further object of the invention is to provide a device of the above mentioned character that is of such a structure that the parts when in an operative position will allow the proper drainage, thus preventing the deposit of water in the parts.

Other objects and advantages of the invention will be apparent during the course of the following description.

In the accompanying drawings forming a part of this specification and in which like numerals are employed to designate like parts throughout the same, Figure 1, is a longitudinal view of the invention as a whole;

Figure 2, is a transverse sectional view on line 2—2 of Figure 1;

Figure 3, is a transverse sectional view of the valve mechanism on line 3—3 of Figure 1, and Figure 4 is a detail section of the valve rod.

In the drawings, wherein for the purpose of illustration, I have shown a preferred embodiment of my invention, the numeral 5 designates a faucet having the usual bore 6 from which extends a discharge pipe 7 inclined downwardly at an angle thereto. The discharge pipe 7 has its free extremity exteriorly screw threaded, as at 8, to which a hose or other implement may be attached. An annular flange 9 extends radially from the inner peripheral edge of the faucet, to provide means whereby the device may be attached to the side of a house.

A pipe 10 extends longitudinally from the faucet 5 being connected to the wall of the bore 6, through the medium of the screw threads 11. Threaded to the opposite end of the pipe is a bulbous shaped housing 12, having formed integral therewith a pipe connection 13, which is disposed at an acute angle, for a purpose to be set forth later. At the jointure of the pipe connection with the housing an apertured partition 14 is formed, providing a valve seat for the valve 15. This valve is of a substantially conical shape at one end and equipped at its reduced end with a washer 16 secured thereto by the screw 17. Screw threads 18 are arranged about the other or enlarged end of the valve 15 and engage the interior screw threads 19 of the valve sleeve 20. The valve sleeve 20 is supported in a central longitudinal position within the housing 12 by the brackets 21, so that the valve washer 16 will be normally seated upon the valve seat 14.

Secured to the valve 15 and extending therefrom is a valve rod 22, the opposite end of which is supported by an apertured cap 23 threaded on the outer end of the faucet as at 24. A packing nut 25 is threaded on the nipple 26 containing the packing 27 and formed integral with the cap 23. The outer end of the rod 22 is squared to receive a wrench or other tool used in rotating the same. Attention is called to the fact that the rod 22 is also apertured throughout its length as at 28, to assist in the drainage.

In operation, the pipe connection 13 is connected to the main water supply pipe (not shown) and since this connection is disposed at an angle the pipe 10 will be disposed in an inclined position, thus providing proper drainage. Since the valve 15 is normally seated upon the valve seat 14, in order to permit the passage of water through the faucet, the valve rod 22 is rotated, which in turn rotates the valve which is lifted from its seat by the movement of the screw threads. After sufficient water has been drawn, the rod is rotated in the opposite direction, thus reversing the movement of the screw threads, which closes the valve. Particular attention is called to the arrangement of the parts comprising the invention, which places the valve mechanism at such a remote position from the faucet that it is impossible under normal conditions for water in the same to become frozen.

It is to be understood that the form of my invention herewith shown and described is to be taken as a preferred example of the same, and that certain changes in the shape, size and arrangement of parts may be resorted to without departing from the spirit of the invention or the scope of the subjoined claims.

Having thus fully described my invention, I claim:—

1. In a device of the character described, a faucet, a pipe extending therefrom, a bulbous shaped housing secured to the free end of the pipe, a valve sleeve supported centrally within the housing, a valve movable in said sleeve, a valve rod extending from said valve through the pipe and faucet, said faucet comprising a discharge pipe extending at an angle thereto.

2. In a device of the character described, a faucet, a valve mechanism, means connecting the valve mechanism and faucet so as to position the valve mechanism at a distance from the faucet, said valve mechanism comprising a bulbous shaped housing surrounding the valve, said housing having a pipe connection formed integral therewith and disposed at an angle thereto.

3. In a device of the character described, a faucet, a pipe extending longitudinally therefrom, a bulbous shaped housing joined to the free end of said pipe, said housing having a pipe connection extending at an acute angle therefrom, a valve mounted in said housing, and means extending from the valve through the pipe and faucet for operating the same.

4. A faucet, a bulbous shaped housing remotely disposed therefrom, an interiorly screw threaded sleeve supported centrally of the housing, an exteriorly screw threaded valve movable in the sleeve, a valve seat upon which the valve normally rests, and a pipe extension cast integral with the housing and at an angle thereto, so that when in use the faucet will be inclined downwardly to afford proper drainage.

In testimony whereof, I have affixed my signature in the presence of two witnesses.

ENOS E. COAR.

Witnesses:
EDWARD ROSTESER,
HARRY ZEIGLER.